Figure 1:
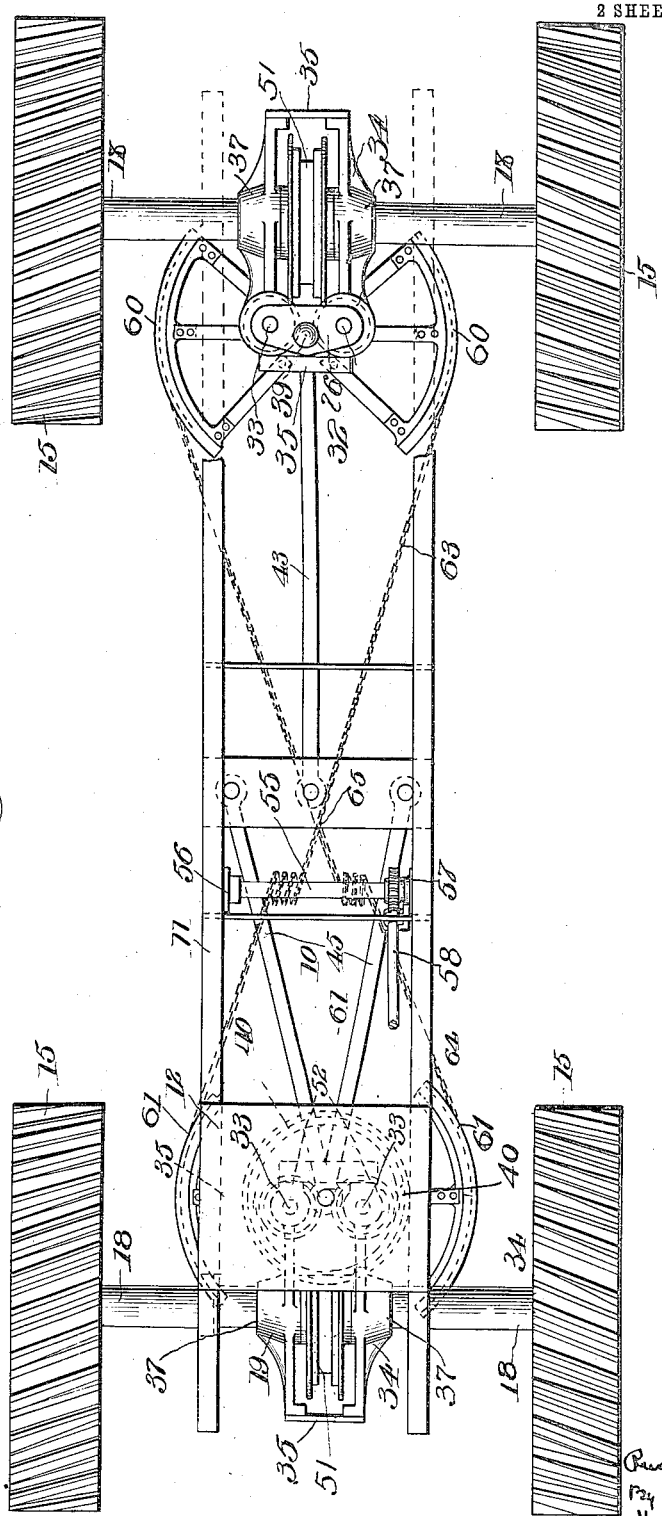

R. B. MORTON.
STEERING MECHANISM FOR MOTOR VEHICLES.
APPLICATION FILED MAY 1, 1912.

1,126,551.

Patented Jan. 26, 1915.
2 SHEETS—SHEET 1.

WITNESSES

INVENTOR
Rudolph B. Morton
by
Hodges & Hodges
Attorneys

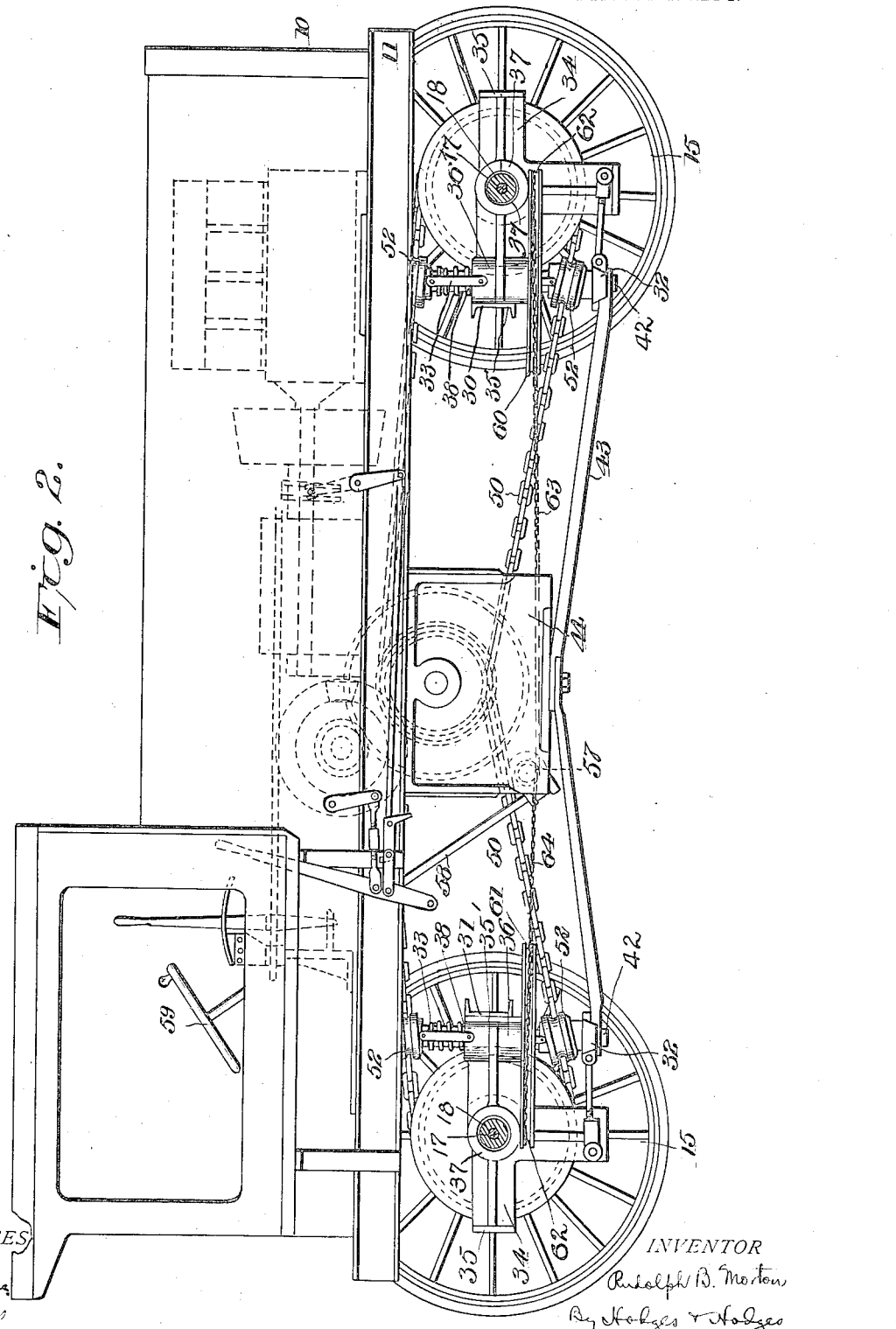

UNITED STATES PATENT OFFICE.

RUDOLPH B. MORTON, OF CLEVELAND, OHIO.

STEERING MECHANISM FOR MOTOR-VEHICLES.

1,126,551. Specification of Letters Patent. Patented Jan. 26, 1915.

Application filed May 1, 1912. Serial No. 694,376.

*To all whom it may concern:*

Be it known that I, RUDOLPH B. MORTON, a citizen of the United States, residing at Cleveland, in the county of Cuyahoga and State of Ohio, have invented new and useful Improvements in Steering Mechanism for Motor-Vehicles, of which the following is a specification.

This invention contemplates certain new and useful improvements in motor vehicles, and relates more particularly to the steering mechanism for such vehicles.

It is one of the objects of the invention to provide means for so connecting the frame thereof with the carrying axles that in steering the vehicle and turning it to either side the front axle will be turned so that its wheels will run toward the side to which the machine is to be turned, the rear axle will be swung so that its wheels will run to the side opposite that to which the machine is to be turned, and the frame of the machine will recede and be gradually carried away from the edges of the wheels as the latter approach the side of said frame, whereby the vehicle may be abruptly turned to either side and in a comparatively small space.

A further object is to so connect each of the axles of a motor vehicle with the frame of the latter, that said axles will swing or turn in steering without changing the tension on the drive chains or on the steering chains.

A further object is to provide means for readily and smoothly swinging both axles in unison in steering the machine.

A further object is to provide means for so connecting the axles of the machine that the shock on one wheel due to meeting obstructions is transmitted to the other wheels and not directly to the frame.

A further object is to provide improved means for applying the steering power in such manner as to secure maximum efficiency.

The invention will be hereinafter fully set forth and particularly pointed out in the claims.

In the accompanying drawings:—Figure 1 is a plan view illustrating a motor vehicle with my invention applied thereto. Fig. 2 is a side view thereof.

Referring to the drawings, 10 designates the main frame of my improved traction engine, which may be of any suitable or preferred construction, the same being illustrated as made up of longitudinal side bars 11 formed of channel irons and united at their ends by end bars 12, said side and end bars being sufficiently braced in any suitable manner.

The traction wheels 15 may be of any preferred type and each provided with a hub keyed, or otherwise secured to rotate with an axle, each axle being formed of two axle sections 17, meeting at their inner ends. Each axle section 17 is inclosed within a tube or sleeve 18.

The main frame is connected with the front and rear axles by means of trucks. Each truck comprises a sub-frame formed of end sections 32 united by rods 33, and supporting arms 34 united by transverse yokes 35, 35', said arms being provided with sockets 36 adapted to receive said vertical rods whereby said upright member is supported. The arms 34 are also provided with sockets 37 to receive the inner ends of the tubes or sleeves 18, relative movement of the sockets 37 and the sleeves 18 being prevented in any suitable or preferred manner. The said sleeves extend from sockets 37 to the hubs of the wheels 15. The rods 33 are provided with annular shoulders adapted to bear upon the upper surfaces of the sockets 36 whereby the weight of the main frame and subframe is supported by the said supporting frame or yoke. By means of this arrangement the subframe may be readily placed in position or removed from sockets 36, as may be desired. The forward truck is connected with the main frame 10 by a ball and socket connection 39, located on one side of the longitudinal median line of the main frame, and the rear truck is connected with the main frame 10 by means of a turntable 40 the axis of said turntable being on the opposite side of said median line. Each truck is provided with a depending lug 42, the lug 42 of the forward truck having a pivotal engagement with the forward end of a radius brace 43, the rear end of which is pivotally secured to the bottom of the case 44 carried by the main frame. The lug 42 of the rear truck engages a socket formed in the ends of a radius brace 45 having diverging arms which are secured at their forward ends to the bottom of the case 44 near opposite sides thereof. By this means the frame is materially stiffened.

The wheels 15 are driven through the axle sections 17 by means of flexible driving members, such as the chains 50, which engage sheaves 51 carried by said axle sections. In order to guide the chains 50 into proper position to engage the sheaves 51 suitable guide wheels 52 are carried by the trucks. In this connection it will be noted that the axes of the guide wheels 52 are located in a line between the axle and a line running transversely through the pivot points of the respective subframes. In the drawing the axes of the guide wheels are shown at an angle of approximately 15° from the center line of the pivot points at right angles to the central line of the machine, but this relation may be varied, the essential arrangement being that said guide wheels be located between the pivot and the axle, so that said guide wheels and the adjacent sheave 51 will all swing on radii from the same center, i. e., the pivot points of the respective subframes. By means of this arrangement the front and rear axles may swing with the respective trucks in steering the machine, and the drive chain will be maintained at approximately the same tension, thereby insuring perfect and smooth driving of each axle irrespective of its angle with relation to the main frame, within the range of its operation.

A rotatable steering drum 55 is mounted in suitable bearings 56 and provided with a worm gear 57 engaged by a worm shaft 58 extending up into the cab of the engine. Said worm shaft is provided with a hand wheel 59 for convenient manipulation. Heretofore where attempts have been made to steer motor vehicles by means of pivoted trucks at each end of the main frame, no consideration has been given to the fact that when the trucks are swung simultaneously on their pivots and in opposite directions the axles are brought closer together. Hence rigid connections between the axles have proven impracticable because they will not give sufficiently to meet this condition, and flexible connections for the same purpose have also proven impracticable because no means is provided for taking up the slack. To overcome this difficulty I secure steering quadrants 60, 61 to the arms 34 of the respective trucks, each quadrant being concentric with the truck pivot and provided with a groove 62 to receive the steering chains. Two steering chains 63, 64 are employed, each being connected to one quadrant 60 on one side of the frame and one quadrant 61 adjacent the other side of the frame, said chains being each passed around the drum 55, one over the top and the other beneath the drum. The arrangement is such that the chains cross each other at the point 65 in advance of the drum 55, but will never touch no matter what the respective angular positions of the axles may be. By operating the worm shaft 58 the drum 55 is actuated in one direction or the other, as the case may be, causing the two axles to swing simultaneously in opposite directions, thereby effecting a very short turning of the entire machine. In this connection it will be noted that the quadrants 60, 61 are concentric with the pivots of the respective subframes, and by means of this relative arrangement of the parts, a pulling action exerted upon one side of either of the steering quadrants will, because of the great leverage secured, swing the respective subframe upon its axis. In this manner the machine is steered. By connecting the steering quadrants to the axle by means of the yokes and arms of the trucks said yokes and their contiguous axles are braced or stiffened and at the same time any pull upon the steering chain is exerted against the axle as well as against the steering arms, thereby greatly increasing the power applied by said steering chains. By this arrangement, also, the steering chains are secured to the axles in such relation to each other that they will not slacken or tighten in the steering of the machine, thereby insuring perfectly smooth and accurate guiding of the latter.

It will be noted that while I have shown and described my invention as being particularly applicable to a traction engine, I do not desire to limit myself in this particular, as the same is also adapted for use as a motor truck or automobile without departing from the spirit of the invention herein involved. It will also be observed that the relation between the main frame and axles is such, that as the axles swing about their respective pivots in steering or turning the machine, said frame is carried away from the wheels as they approach the same on the inner side of the turn, thereby enabling the machine to be turned in a much smaller radius than would otherwise be possible. It will be further noted that the trucks 30, 31 are so related to the main frame that they will swing on arcs of equal radii, whereby the wheels will track in steering.

Having thus explained the nature of my invention and described an operative manner of constructing and using the same, although without attempting to set forth all of the forms in which it may be made, or all of the forms of its use, what I claim is:—

1. An improvement in motor vehicles, comprising a main frame, axles, supporting arms carried by one of said axles, means for pivotally connecting said arms with said main frame, means directly engaging said arms for swinging the latter on said pivotal connection, and means for connecting the other axle to the main frame.

2. An improvement in motor vehicles, comprising a main frame, axles, supporting arms carried by one of said axles, means for pivotally connecting said arms with said main frame, a steering quadrant secured to said arms, means engaging said quadrant for swinging said arms on said pivotal connection, and means for connecting the other axle to said main frame.

3. An improvement in motor vehicles, comprising a main frame, axles, supporting arms carried by one of said axles, a subframe carried by said arms, means for pivotally connecting said subframe with said main frame, steering quadrants supported by said arms and inclosing said subframe, means engaging said quadrant for swinging said subframe and arms on said pivotal connection, and means for securing the other axle to said main frame.

4. An improvement in motor vehicles, comprising a main frame, axles, a truck supported by one of said axles and provided with supporting arms, a subframe rigidly supported by said arms, means for pivotally connecting said subframe to said main frame, a steering quadrant secured to said supporting arms adjacent said subframe, means engaging said quadrant for swinging said truck on said pivotal connection, and means for securing the other axle to said main frame.

5. An improvement in motor vehicles, comprising a main frame, axles, a truck supported by one of said axles and provided with arms, means for pivotally connecting said truck with said main frame, a steering quadrant secured to opposite arms of said truck, steering chains engaging said quadrant for swinging said truck on said pivotal connection, means for actuating said steering chains, and means for securing the other axle to said main frame.

6. An improvement in motor vehicles, comprising a main frame, axles, a truck supported by one of said axles and provided with arms, a subframe carried by said arms, means for pivotally connecting said subframe with said main frame, a steering quadrant secured to said arms adjacent said subframe, steering chains engaging said quadrant for swinging said subframe and yoke on said pivotal connection, means for actuating said steering chains, and means for securing the other axle to said main frame.

7. An improvement in motor vehicles, comprising a main frame, axles, a truck having arms secured to one of said axles and connected by a transverse member, means for pivotally connecting the transverse member with said main frame, means engaging said arms for swinging said axle and truck on said pivotal connection, and means for connecting the other axle to said main frame.

8. An improvement in motor vehicles, comprising a main frame, axles, a truck supported by one of said axles and provided with arms, means for pivotally connecting said truck with said main frame, means engaging said arms for swinging the truck on said pivotal connection, and means for connecting the other axle to said main frame.

9. An improvement in motor vehicles, comprising a main frame, axles, a truck provided with arms supported by one of said axles, and a subframe provided with spaced apart rods supported by said arms, means for pivotally connecting said subframe with the main frame, flexible steering members for swinging said truck on said pivotal connection, means for preventing tightening or slackening of said steering members when the truck is swung, and means for connecting the other axle to said main frame.

10. A motor vehicle comprising a main frame, axles, a truck carried by each axle, said trucks being each provided with supporting arms, a subframe carried by said arms, means for pivotally connecting the arms of each truck to the main frame, steering chains directly engaging said arms to swing the latter on their pivotal connection, said chains extending diagonally across the space between the axles and crossing at a point between said axles, a steering drum for actuating said chains, and means for operating said drum.

11. A motor vehicle comprising a main frame, axles, spaced apart supporting arms carried by each axle, independent and detachable pivoting means connected to swing with said arms and engaging said main frame, steering quadrants secured to said arms, steering chains connecting the steering quarants of each set of arms, said chains extending diagonally across the space between said axles, and operating means for said chains engaging the latter between the axles at a point spaced from the crossing point to said chains.

12. An improvement in motor vehicles, comprising a main frame, axles, spaced apart supporting arms carried by each axle, independent and detachable pivoting means connected to swing with said arms and engaging said main frame, steering quadrants secured to said arms, crossed steering chains connecting the steering quadrants of each set of arms and extending diagonally across the space between the axles, a steering drum for actuating both of said chains, and means for operating said drum.

13. An improvement in motor vehicles, comprising a main frame, axles, yokes having arms secured to said axles, subframes secured to said arms, means for pivotally connecting said subframes with said main frame, steering quadrants secured to the arms of said yokes, steering chains connecting the steering quadrants and extending diagonally across the space between the quadrants, a steering drum for actuating said chains, and means for operating said drum.

14. An improvement in motor vehicles, comprising a main frame, axles, trucks having arms secured to said axles, subframes secured to said arms, means for pivotally connecting said subframes with said main frame, steering quadrants secured to the arms of said trucks and encircling said subframes, steering chains connecting the steering quadrants and extending diagonally across the space between the quadrants, a steering drum for actuating said chains, and means for operating said drum.

15. An improvement in motor vehicles, comprising a main frame, axles, a truck provided with arms carried by each axle, independent and detachable pivoting means connected to swing with said arms and engaging said main frame, steering quadrants secured to said arms, and steering chains connecting the steering quadrants of said trucks, and manually controlled means for actuating said steering chains.

16. An improvement in motor vehicles, comprising a main frame, axles, trucks having arms secured to said axles, means for pivotally connecting said arms to said main frame, steering quadrants secured to said arms, and steering chains connecting the steering quadrants.

17. An improvement in motor vehicles comprising a main frame, axles, wheels supporting said axles, arms supported by said axles, means for pivotally connecting the inner ends of said arms to said main frame so that said axles and yokes will swing on arcs of equal radii, whereby said wheels will track in steering, and manually controlled means directly engaging said arms for simultaneously swinging said axles in opposite directions.

18. An improvement in motor vehicles comprising a main frame, axles, wheels supporting said axles, arms supported by said axles, independent and detachable pivoting means connected to swing with said arms and engaging said main frame so that said axles and arms will swing on arcs of equal radii, flexible steering members directly engaging said arms for simultaneously swinging said axles in opposite directions, manually controlled means for actuating said steering members, and means for preventing tightening or slackening of said steering members when said trucks are swung.

19. An improvement in motor vehicles comprising a main frame, axles, wheels supporting said axles, arms supported by said axles, detachable means carried by said arms for pivotally connecting the arms with the frame, said pivoting means being connected to swing with said arms and engaging said main frame so that said axles and arms will swing on arcs of equal radii, flexible steering members for simultaneously swinging said trucks in opposite directions, manually controlled means for actuating said steering members, and quadrants connected with said arms and coöperating with said steering members to prevent tightening or slackening of the latter when said yokes are swung.

20. A traction engine comprising a main frame, axles, wheels supporting said axles, a truck including arms supported by one of said axles, a sub-frame provided with rods engaged by said arms, whereby said subframe is supported, means carried by the main frame for driving said axle, means for pivotally connecting said main frame and subframe, means connected with said subframe for swinging the latter about said pivotal connection, and means for connecting said main frame and the other axle.

21. A traction engine comprising a main frame, axles, wheels supporting said axles, a truck including supporting arms carried by one of said axles and an independent subframe detachably supported by said arms, means for pivotally connecting said main frame and said subframe, means connected with said arms for swinging said truck about said pivotal connection, means for connecting said main frame and the other axle, and means carried by said main frame for driving said axles.

In testimony whereof I have hereunto set my hand in presence of two subscribing witnesses.

RUDOLPH B. MORTON.

Witnesses:
 CHAS. E. RIORDAN,
 WM. S. HODGES.